United States Patent [19]

Woldenberg et al.

[11] Patent Number: 5,308,558
[45] Date of Patent: May 3, 1994

[54] PROCESS FOR FOAMING THERMOPLASTIC POLYCARBONATES

[75] Inventors: Edwin Woldenberg; Klaus Kircher, both of Leverkusen; Klaus Horn, Krefeld; Johann Piontek, Dormagen; Burkhard Köhler; Wolfgang Ebert, both of Krefeld, all of Fed. Rep. of Germany

[73] Assignee: Bayer Aktiengesellschaft, Leverkusen, Fed. Rep. of Germany

[21] Appl. No.: 106,469

[22] Filed: Aug. 13, 1993

Related U.S. Application Data

[63] Continuation of Ser. No. 814,093, Dec. 26, 1991, abandoned.

[30] Foreign Application Priority Data

Jan. 5, 1991 [DE] Fed. Rep. of Germany ....... 4100201

[51] Int. Cl.$^5$ ............................................. B29C 67/22
[52] U.S. Cl. ..................... 264/45.3; 264/53; 264/54; 264/300
[58] Field of Search .................. 264/45.3, 300, 51, 53, 264/54, 328.1; 521/180

[56] References Cited

U.S. PATENT DOCUMENTS

| | | |
|---|---|---|
| 3,028,365 | 4/1962 | Schnell et al. |
| 3,567,813 | 3/1971 | Keane et al. ......................... 264/102 |
| 3,577,378 | 5/1971 | Streib et al. ........................... 260/37 |
| 3,903,224 | 9/1975 | Billiu ................................... 264/46.7 |
| 3,969,313 | 7/1976 | Aishima et al. |
| 4,243,575 | 1/1981 | Myers et al. .................... 260/37 PC |
| 4,407,768 | 10/1983 | Garcia et al. .......................... 264/54 |
| 4,845,193 | 7/1989 | Umemura et al. .................. 528/502 |
| 4,982,014 | 1/1991 | Freitag et al. ....................... 568/721 |
| 5,034,056 | 7/1991 | Von Bonin . |

FOREIGN PATENT DOCUMENTS

| | | |
|---|---|---|
| 115162 | 12/1983 | European Pat. Off. . |
| 841652 | 7/1960 | United Kingdom . |
| 1443549 | 7/1976 | United Kingdom . |

OTHER PUBLICATIONS

World Patents Index AN 78-70233A & SU-A-579,289 Nov. 25, 1977.
Patent Abstract of Japan, vol. 4, No. 65, May 16, 1990, JP 55-31871, Mar. 6, 1980.
World Patents Index AN 77-369574 & JP-A-52 45 667, Apr. 1977.
Patent Abstract of Japan, vol. 6, No. 78, May 1982 & JP-A-57 016 034 Jan. 27, 1982.
Patent Abstracts of Japan vol. 3, No. 79, Jul. 1979, & JP A-54 054 165 Apr. 28, 1979.

*Primary Examiner*—Allan R. Kuhns
*Attorney, Agent, or Firm*—Joseph C. Gil; Aron Preis

[57] ABSTRACT

A process for producing foamed articles containing thermoplastic aromatic polycarbonates is disclosed. Accordingly, thermoplastic aromatic polycarbonates are mixed with about 0.01 to 10% by weight of $Al_2O_3(H_2O)_3$ and the mixture is either extruded in an extruder at temperatures from 220° C. to 320° C. without application of a vacuum to produce foamed molded articles or it is injection molded in injection molding machines without application of vacuum at temperatures from 290° C. to 330° C. to produce molded foam articles.

4 Claims, No Drawings

PROCESS FOR FOAMING THERMOPLASTIC POLYCARBONATES

This application is a continuation of application Ser. No. 07/814,093, filed Dec. 26, 1991, now abandoned.

FIELD OF THE INVENTION

The present invention relates to thermoplastic molding compositions and more particularly to a process for foaming thermoplastic aromatic polycarbonates.

SUMMARY OF THE INVENTION

The present invention relates to a process for foaming thermoplastic aromatic polycarbonates, characterized in that thermoplastic aromatic polycarbonates are mixed with from 0.01% by weight to 10% by weight, preferably from 0.1% by weight to 3% by weight, of $Al_2O_3(H_2O)_3$ and the mixture is either extruded in an extruder at temperatures from 220° C. to 320° C. without application of a vacuum to produce foamed molded articles or it is injection molded in injection molding machines without application of vacuum at temperatures from 290° C. to 330° C. to produce molded foam articles.

BACKGROUND OF THE INVENTION

Foams of high molecular weight polycarbonates are known (see, for example, DE-AS 1,031,507). Suitable blowing agents are, for example, inert gases such as $N_2$ or $CO_2$ or compounds which split off $CO_2$.

In the past, it was widely held that thermoplastic polycarbonates could only be processed satisfactorily in a completely dry state and that the presence of moisture upwards of a certain quantity led to molecular weight degradation and the formation of blisters (see, for example, Taschenbuch Bayer-Kunststoffe, 2nd Edition 1959, page 177, Plastics Technologie, 10, 1964, pages 32–36 and GB-PS 841,652).

This sensitivity to moisture of thermoplastic polycarbonates does not exist in certain cases, for example if the moisture is introduced into the thermoplastic polycarbonate as an aqueous size for glass fibers or if the moisture is added for the removal of residues of solvent from the polycarbonate and subsequently expel led together with the solvent residues in an evaporation extruder (see U.S. Pat. Nos. 3,577,378, 3,567,813 and EP-A2-0,300,485).

It was an object of the present invention to choose the operating conditions for the incorporation of $Al_2O_3(H_2O)_3$ and subsequent molding of the mixture of polycarbonate with $Al_2O_3(H_2O)_3$ so that controlled degradation of the polycarbonate will take place which will bring about foaming without too seriously impairing the mechanical and other properties of the thermoplastic polycarbonate and of the molded foam products obtainable therefrom according to the invention. This has been achieved by the operating conditions according to the invention, which could not have been deduced from the state of the art.

DETAILED DESCRIPTION OF THE INVENTION

The polycarbonate foams obtainable by the process according to the invention are intrinsically very light in color and very tough and have an excellent cell structure. The degree of foaming can be controlled over a wide range by the nature and quantity of the additives conventionally used in the production of foams.

The present invention thus also relates to the use of $Al_2O_3(H_2)_3$ for foaming thermoplastic aromatic polycarbonates.

The present invention in addition relates to the molded polycarbonate foam products obtainable by the process according to the invention.

Thermoplastic aromatic polycarbonates for the purpose of the present invention are polycarbonates which have been prepared from diphenols and carbonate donors by the usual methods known from the literature (see, for example, H. Schnell, Chemistry and Physics of Polycarbonates, Interscience Publishers, New York, 1964, U.S. Pat. No. 3,028,365 and German Offenlegungsschrift 3,832,396 LeA-26,344).

The following are examples of diphenols suitable for such polycarbonates: Hydroquinone, resorcinol, dihydroxydiphenyls, bis-(hydroxyphenyl)-alkanes, bis-(hydroxyphenyl)cycloalkanes, bis-(hydroxyphenyl)-sulphides, bis-(hydroxyphenyl)-ethers, bis-(hydroxyphenyl)-ketones, bis-(hydroxyphenyl)-sulphones, bis-(hydroxyphenyl)-sulphoxides, $\alpha,\alpha'$ bis(hydroxyphenyl)diisopropylbenzenes and derivatives thereof which are alkylated or halogenated in the nucleus.

The following are examples of preferred diphenols:
4,4'-Dihydroxydiphenyl, 2,2-bis-(4-hydroxyphenyl)-propane, 2,4-bis-(4-hydroxyphenyl)-2-methylbutane, 1,1-bis(4-hydroxyphenyl)-p-diisopropylbenzene, 2,2-bis-(3-methyl-4,-hydroxyphenyl)-propane, bis-(3,5-dimethyl-4-hydroxyphenyl)-methane, 2,2-bis-(3,5-dimethyl-4-hydroxyphenyl)-propane, bis-(3,5-dimethyl-4-hydroxyphenyl)-sulphone, 2,4-bis-(3,5-dimethyl-4-hydroxyphenyl)-2-methylbutane, 1,1-bis-(3,5-dimethyl-4-hydroxyphenyl)-p-diisopropylbenzene, 2,2-bis-(3,5-dichloro-4-hydroxyphenyl)propane, 2,2-bis-(3,5-dibromo-4-hydroxyphenyl)-propane and 1,1-bis-(4-hydroxyphenyl)-3,3,5-trimethylcyclohexane.

The following are examples of particularly preferred diphenols: 2,2-Bis-(4-hydroxyphenyl)-propane, 2,2-bis-(3,5-dimethyl-4-hydroxyphenyl)-propane, 2,2-bis-(3,5-dichloro-4-hydroxyphenyl)-propane, 2,2-bis-(3,5-dibromo-4-hydroxyphenyl)propane, 1,1-bis-(4-hydroxyphenyl)-cyclohexane and 1,1-bis-(4-hydroxyphenyl)-3,3,5-trimethylcyclohexane.

The diphenols may be used either singly or as mixtures with one another and may be used both for homopolycarbonates and for copolycarbonates. The diphenols are known from the literature or may be prepared by processes known from the literature.

Minor quantities, preferably from 0.05 to 2.0 mole-%, based on the moles of diphenols, of trifunctional or higher than trifunctional compounds may also be included, in particular those having three or more than three phenolic hydroxyl groups. The following are some examples of suitable compounds having three or more than three phenolic hydroxyl groups:
Phloroglucinol,
4,6-dimethyl-2,4,6-tri-(4-hydroxyphenyl)-heptene-2,
4,6-dimethyl-2,4,6-tri-(4-hydroxyphenyl)-heptane,
1,3,5-tri-(4-hydroxyphenyl)-benzene,
1,1,1-tri-(4-hydroxyphenyl)-ethane,
tri-(4-hydroxyphenyl)-phenylmethane,
2,2- bis-[4,4-bis-(4-hydroxyphenyl)-cyclohexyl]-propane,
2,4-bis-[4-hydroxyphenyl-isopropyl)-phenol,
2,6-bis-(2-hydroxy-5'-methyl-benzyl)-4-methylphenol,
2-(4-hydroxyphenyl)-2-(3 4-dihydroxyphenyl)-propane, hexa-(4-(4-hydroxyphenyl-isopropyl)-phenyl)-ortho-terephthalic acid ester,
tetra-(4-hydroxyphenyl)-methane,
tetra-(4-(4-hydroxyphenyl)-isopropyl)-phenoxy)-methane and
1,4-bis-(4', 4''-dihydroxytriphenyl)-methyl-benzene.

2,4-Dihydroxybenzoic acid, trimesic acid, cyanuric chloride and 3,3-bis-(3-methyl-4-hydroxyphenyl)-2-oxo-2,3-dihydroindole may also be used as branching agents.

The 0.05 to 2 mole-% of branching agents optionally used, based on the quantity of diphenols used, may either be introduced in the aqueous alkaline phase together with the diphenols and the molecular weight regulators or added as a solution in an organic solvent before phosgenation.

Suitable molecular weight regulators are the compounds known for this purpose, especially monophenols.

The aromatic polycarbonates according to the present invention should have weight average molecular weights Mw (determined by gel permeation chromatography) of from 5000 to 50,000, preferably from 15,000 to 35,000.

The solution viscosities are accordingly from 1.15 to 1.35, determined in dichloromethane (0.5 g/100 ml).

Thermoplastic aromatic polycarbonates for the purpose of the present invention include thermoplastic aromatic polyester carbonates, in other words, "polycarbonates" in which a proportion of the carbonate structural units, at most 50 mole-% thereof, are replaced by aromatic dicarboxylate structural units in known manner.

The following are examples of suitable aromatic dicarboxylic acids: orthophthalic acid, terephthalic acid, isophthalic acid, tert.-butylisophthalic acid, 3,3'-diphenyldicarboxylic acid, 4,4'-diphenyldicarboxylic acid, 4,4'-diphenylether dicarboxylic acid, 4,4'-benzophenone dicarboxylic acid, 3,4'-benzophenone dicarboxylic acid, 4,4'-diphenylsulphone dicarboxylic acid, 2,2-bis-(4-carboxyphenyl)-propane and trimethyl-3-phenylindan-4,51-dicarboxylic acid.

Among the aromatic dicarboxylic acids, it is particularly preferred to use terephthalic acid and/or isophthalic acid.

Suitable diphenols are those mentioned above for the preparation of the polycarbonates.

The same applies to the branching agents and to the monophenolic chain terminators, but in this case aromatic monocarboxylic acids may also be used, for example in the form of their acid chlorides or esters.

The carbonic acid may be built into the polyester carbonates either via $COCl_2$ or via diphenylcarbonate, depending on the process of separation employed, i.e. depending on whether phase interface polycondensation or solvent-free transesterification is used for the preparation of the polyester carbonate.

The same applies to the aromatic dicarboxylic acids; they are either used as aromatic dicarboxylic acid dichlorides in the diphasic interface process or as dicarboxylic acid diesters in the solvent-free transesterification process. The same applies if monocarboxylic acids are used as chain terminators.

Preparation of the polyester carbonates to be foamed according to the invention is carried out by known methods of preparation, for example by the phase interface process or the solvent-free transesterification process, as already mentioned.

The polyester carbonates to be foamed may thus be either linear or they may be branched in known manner.

The aromatic polyester carbonates according to the present invention have average values for weight average molecular weights Mw (determined by gel permeation chromatography) of from 5000 to 50,000, preferably from 15,000 to 35,000.

The solution viscosities are accordingly from 1.15 to 1.35, determined in dichloromethane (0.5 g/100 ml).

The molar ratio of carbonate units to aromatic dicarboxylate units in the polyester carbonates to be foamed according to the invention is at least 50:50, preferably 75:25, especially 90:10. In other words, the carbonate structural units predominate as a source of $CO_2$ in the polyester carbonates which are to be foamed according to the invention.

$Al_2O_3(H_2O)_3$ to be used according to the invention is known per se from the literature.

The foaming process according to the invention may be carried out with the addition of additives conventionally used for the production of foams, such as reinforcing materials, e.g. glass fibers, and/or nucleating agents and/or flame retardants and/or mold release agents and/or dyes and/or pigments, e.g. rutile or carbon black, and/or stabilizers against heat, radiation and moisture.

The present invention thus also relates to the foaming of thermoplastic aromatic polycarbonates containing conventional additives, characterized in that after addition of the usual additives, thermoplastic aromatic polycarbonates are mixed with from 0.01% by weight to 10% by weight, preferably from 0.1% by weight to 3% by weight, of $Al_2O_3(H_2O_3$ and either extruded in an extruder at temperatures from 220° C. to 320° C. without application of a vacuum to produce molded foam articles or injection molded in injection molding machines without application of a vacuum at temperatures from 290° C. to 330° C. to produce molded foam articles.

The present invention in addition relates to the additive containing molded polycarbonate foam products obtainable by this process according to the invention.

The process according to the invention may be extended in that other thermoplasts may be added to the polycarbonates to be foamed, preferably thermoplastic polyalkylene terephthalates, ABS polymers, SAN polymers and polyolefins, in quantities of up to 100% by weight, based in each case on the weight of the polycarbonate.

The foaming process is not blocked by the presence of these other thermoplasts.

The present invention thus also relates to the foaming of thermoplastic aromatic polycarbonates mixed with at most equal quantities by weight of other thermoplasts, characterized in that the thermoplastic aromatic polycarbonates mixed with at most equal quantities by weight of other thermoplasts are foamed according to the application.

Here again, the usual additives already mentioned may be included.

The present invention in addition relates to those polycarbonate foams obtainable by this process according to the invention which contain other thermoplasts and optionally the usual additives.

The polycarbonates to be foamed according to the invention may also have the known impact strength modifiers such as, for example, hydrogenated butadiene-styrene copolymers or acrylate graft rubbers added to them in the usual quantities, preferably in quantities of up to 10% by weight, based on the weight of the polycarbonate.

The present invention thus also relates to the foaming of thermoplastic aromatic polycarbonates in all its variations described up to now, characterized in that impact strength modifiers have been added to the polycarbonates in quantities of up to 10% by weight, based on the weight of the polycarbonate, before foaming is carried out.

The present invention also relates to the molded polycarbonate foam products obtainable by this process.

Examples of thermoplastic polyalkylene terephthalates used according to the invention include those based on ethylene glycol, propanediol-(1,3), butanediol-(1,4), hexanediol-(1,6) and 1,4-bishydroxymethylcyclohexane. The molecular weights (Mw) of these polyalkylene glycol terephthalates are from 10,000 to 80,000. The polyalkylene glycol terephthalates may be obtained by known processes, for example from a terephthalic acid dialkylester and the corresponding diol by transesterification. For example, a lower alkyl ester of terephthalic acid, preferably the dimethylester, may be used as starting material, and this is esterified with an excess of diol in the presence of suitable catalysts to produce the bishydroxyalkyl ester of terephthalic acid. In this process, the temperature is raised from an initial 140° C. to 210°-220° C. The alcohol liberated is distilled off. Condensation is then completed it temperatures from 210°-280° C. while the pressure is lowered stepwise to below 1 Torr so that the excess diol is distilled off.

Thermoplastic ABS polymers to be used according to the invention are those in which either a monomer selected from styrene and methylmethacrylate or a monomer mixture of from 95-50% by weight of styrene, α-monostyrene, methyl methacrylate or mixtures thereof and from 5-50% by weight of acrylonitrile, methylmethacrylate, maleic acid anhydride, N-substituted maleimides or mixtures thereof is graft polymerized on a rubber. Suitable rubbers include in particular polybutadiene, butadiene/styrene copolymers containing up to 30% by weight of styrene incorporated by polymerization, copolymers of butadiene and acrylonitrile containing up to 20% by weight of acrylonitrile, or copolymers of butadiene with up to 20% by weight of a lower alkyl ether of acrylic or methacrylic acid (e.g. methyl acrylate, ethyl acrylate, methyl methacrylate or ethyl methacrylate).

The graft copolymers contain from 5-80% by weight, in particular from 20-70% by weight, of rubber and from 95-20% by weight, in particular from 80-30% by weight, of graft copolymerized monomers. The rubbers are present in these graft copolymers in the form of at least partially cross-linked particles having an average particle size of from 0.09 to 5 μm, in particular from 0.1 to 1 μm. Such graft copolymers are prepared by radical graft copolymerization of monomers selected from styrene, α-methylstyrene, acrylonitrile, methyl methacrylate and maleic acid anhydride in the presence of the rubbers to be grafted, and they are all known compounds. Preferred methods of preparation of such graft copolymers are emulsion polymerization, solution polymerization, solvent free polymerization and suspension polymerization.

Thermoplastic SAN polymers to be used according to the invention are copolymers of from 95-50 parts by weight of styrene, α-methyl styrene or methyl methacrylate or mixtures thereof and from 5-50 parts by weight of acrylonitrile, methacrylonitrile, methyl methacrylate or mixtures thereof. Among these copolymers, products of about 80-60% by weight of styrene and 20-40% by weight of acrylonitrile and the analogous copolymers of α-methylstyrene are particularly preferred.

Thermoplastic polyolefins used according to the invention are polymers of aliphatic, unsaturated hydrocarbons such as, for example, ethylene, propylene, butylene or isobutylene obtained by conventional processes, e.g. radical polymerization, and having average weight average molecular weights Mw (determined by gel chromatographic methods) of from 1000 to 3,000,000. Both high pressure polyolefins and low pressure polyolefins may be used. The unsaturated hydrocarbons may also be copolymerized in known manner with other vinyl monomers, e.g. vinyl acetate.

Preliminary mixing of the individual components, i.e. the polycarbonates, $Al_2O_3(H_2O)_3$, conventional additives, other thermoplasts and/or impact strength modifiers, may be carried out at room temperature in known manner.

The foaming according to the invention is carried out in the usual apparatus.

The foams obtainable according to the invention may be formed into any molded products or cut to the required size and shape after foaming.

The molded foam products obtainable according to the invention may advantageously be used as molded parts for the production of large surfaced coverings for lamps, housings or office equipment or for the production of large surface elements for the construction of cupboards.

The invention is further illustrated but is not intended to be limited by the following examples in which all parts and percentages are by weight unless otherwise specified.

EXAMPLES

Example 1

A mixture of 87.5% by weight of a homopolycarbonate of 2,2-bis-(4-hydroxyphenyl)-propane, Mw about 30,000, 10% by weight of a copolycarbonate of 2,2-bis-(4-hydroxyphenyl)propane and 2,2-bis-(3,5-dibromo-4-hydroxyphenyl)-propane polycarbonate containing 30% by weight of -short glass fibers (E-glass), 2% of pigment 07/394 (mixture of $TiO_2$ and carbon black) and 0.5% by weight of $Al_2O_3(H_2O)_3$ is extruded. Extrusion is carried out in a three-zone single-screw extruder having a constant pitch of ID, a screw diameter of D=37 mm, a screw length of L=25 and a pitch ratio (ejection zone/intake zone) of 1:2.5. The temperatures of the zones were 270° C. 250° C. and 230° C. in injection molding machine without application of a vacuum to produce foamed molded articles. Foaming was carried out under conditions of unrestricted expansion without calibration. A finely porous, closed cell foam having a density of 0.65 g/cm3 was obtained.

Although the invention has been described in detail in the foregoing for the purpose of illustration, it is to be understood that such detail is solely for that purpose and that variations can be made therein by those skilled in the art without departing from the spirit and scope of the invention except as it may be limited by the claims.

What is claimed is:

1. A process for producing a foamed molded article consisting of:

(i) mixing a thermoplastic aromatic polycarbonate resin with about 0.01 to 10 percent by weight of $Al_2O_3(H_2O)_3$ to produce a blend and (ii) extruding said blend at temperatures of from 220° C. to 320°C. without the application of vacuum to produce said article, or (iii) injection molding said blend at temperatures of from 290° to 330° C. without the application of vacuum to produce said article.

2. The process of claim 1 wherein said blend further contains at least one additive selected from the group consisting of reinforcing materials, nucleating agents, flame retardants, mold release agents, impact modifiers, dyes, pigments, heat stabilizers, UV stabilizers and moisture stabilizers.

3. A process for producing a foamed molded article consisting of:

(i) mixing a thermoplastic aromatic polycarbonate resin with about 0.01 to 10 percent by weight of $Al_2O_3(H_2O)_3$ to produce a blend and (ii) extruding said blend at temperatures of from 220° 1 to 320° C. without the application of vacuum to produce said article.

4. A process for producing a foamed molded article consisting of:

(i) mixing a thermoplastic aromatic polycarbonate resin with about 0.01 to 10 percent by weight of $Al_2O_3(H_2O)_3$ to produce a blend and (ii) injection molding said blend at temperatures of from 290° to 330° C. without the application of vacuum to produce said article.

* * * * *